(No Model.)
R. HOCKIN.
FISHWAY.
No. 437,202. Patented Sept. 30, 1890.
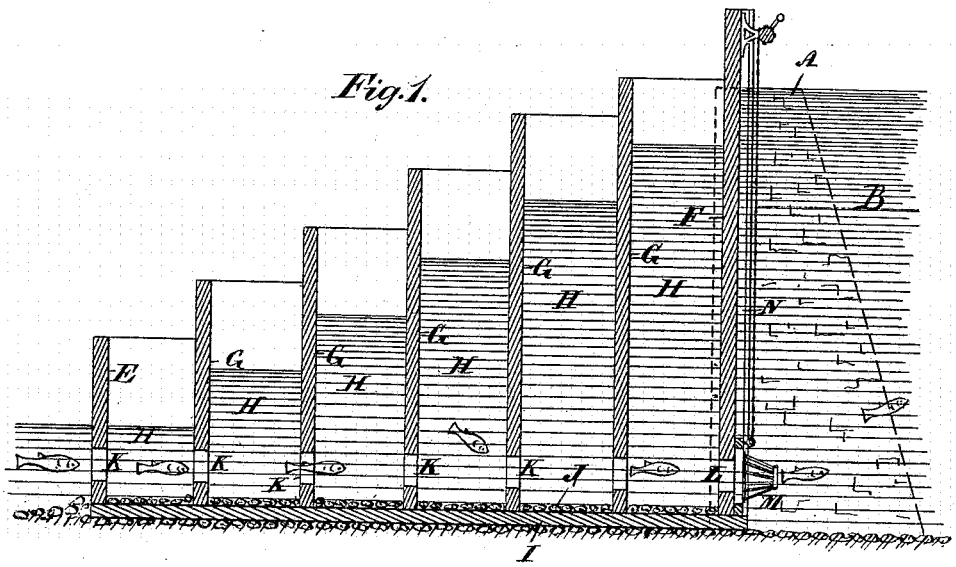
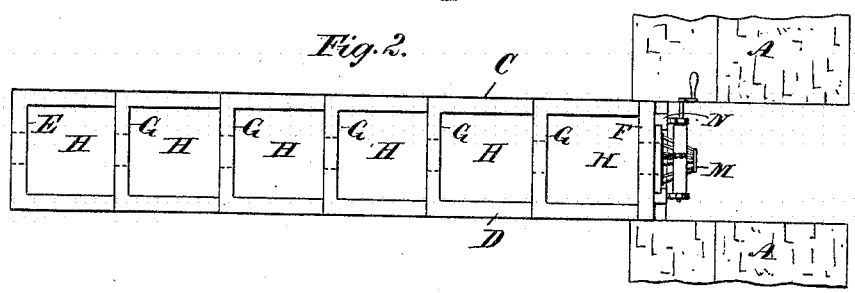
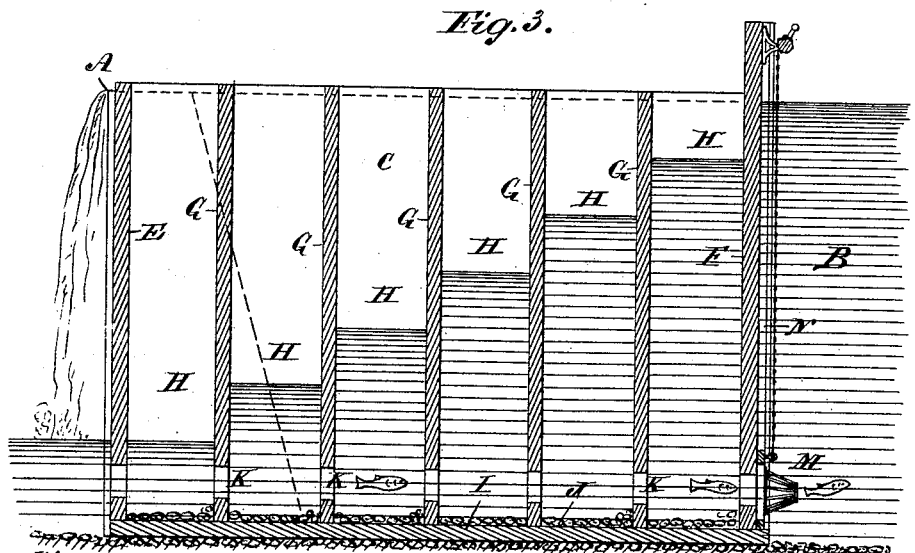
Witnesses:
John Grist
H. H. Dorsey.
Inventor:
Robert Hockin
By Henry Grist
Attorney.

UNITED STATES PATENT OFFICE.

ROBERT HOCKIN, OF PICTOU, NOVA SCOTIA, CANADA.

FISHWAY.

SPECIFICATION forming part of Letters Patent No. 437,202, dated September 30, 1890.

Application filed May 31, 1890. Serial No. 353,814. (No model.) Patented in Canada May 3, 1890, No. 34,246.

*To all whom it may concern:*

Be it known that I, ROBERT HOCKIN, of Pictou, in the Province of Nova Scotia, in the Dominion of Canada, have invented certain new and useful Improvements in Fishways, (for which I have obtained a patent in the Dominion of Canada, No. 34,246, bearing date May 3, 1890;) and I do hereby declare that the following is a full, clear, and exact description of the same, reference being had to the accompanying drawings, in which—

Figure 1 is a longitudinal vertical section of my improved fishway placed below the river-dam. Fig. 2 is a plan or top view of the same, and Fig. 3 is a longitudinal vertical section of my improved fishway sunk in the pond above the dam.

My invention has for its object to allow fish to pass from a lower to a higher level of water without leaping step by step from one lodgment to another.

My invention consists of a fishway having a series of compartments connected by an aperture near the bottom and preferably in line with one another and with an aperture in the dam, said apertures preferably on the same level, so that the water flowing into the first compartment will rise higher than the water in the second compartment, and the water in the next compartment will not rise to the same level as in the next compartment, and so on step by step, whereby the height of water will be diminished in the series of compartments until the water will flow from the last compartment into the river with so little force that fish will easily swim against the current and then pass through the several compartments until the water above the dam is reached, the fish then having access to the natural channel.

A represents the dam or other obstruction to be overcome in the river, and my improved fishway can be placed or built in the river below the dam or in the pond B above the dam, as shown in Fig. 3.

My fishway is constructed of sides C D, ends E F, and subdivided transversely by partitions G, forming compartments H, and provided with a floor I, preferably horizontal, and, if desired, stones or gravel may be laid on said floor to give a natural appearance and entice the fish to pass. The partitions G have each an aperture K near or at the bottom and preferably in line one with another, and with a like aperture L in the dam A or at the end thereof, as circumstances may determine, so that all the water fed to the compartments will pass through the aperture in the dam into the first compartment and thence into the several compartments successively, the water from natural causes rising to different levels in the compartments, diminishing from inlet to outlet. The current flowing through the several compartments will also gradually diminish in force, if not almost equalized, the outlet flowing into the river under diminished pressure, against which a fish can easily swim.

M is a removable truncated cone grating sliding in ways N to cover the inlet to the fishway to prevent débris clogging the passages.

In Fig. 3 is shown my improved fishway placed, built, or sunk above the dam. The side and end walls extend above the water in the pond, and the outlet-water passage is connected with an aperture in the dam or at its side or end, as circumstances may determine, whereby fish can swim up to the dam and then through the aperture into the compartment having the least head of water, and then through the connecting-aperture into the next compartment having a higher head of water, and so on through the several compartments until the pond is reached. The aperture of exit in the last compartment may have a grating M, if desired.

Owing to the construction of my improved fishway, the water will not rise to the same level in the compartments, because the outflow checks the inflow under pressure of the diminishing heads of water step by step in the successive compartments, and the force of the current passing through the apertures connecting the several compartments with one another and with the river will be lessened, so that fish will easily swim through the apertures in passing through the successive compartments constituting the fishway.

I claim as my invention—

1. A fishway constructed of a series of successive compartments formed by longitudinal side walls, ends, and transverse partitions rising above the water to prevent inflow and having a floor as horizontal as the nature of the ground will admit, said compartments connected near the floor by an aperture in each partition and with the river by an aperture in the end compartments, said apertures being preferably in alignment for direct passage of the fish, whereby the height of water in each compartment will be diminished step by step from inflow to outlet and the passage of the fish through the several compartments and apertures be effected without leaping or jumping, as set forth.

2. A fishway consisting of a series of topless compartments having approximately a level floor and side walls, ends, and transverse partitions from the bottom of the river to above water-line, said compartments connected with one another and with the river by submerged apertures at the ends and in the partitions, whereby the water in the several compartments will be lower step by step from inflow to outlet and the submerged apertures be approximately on the same level and, preferably, in alignment for passage of fish, as set forth.

ROBERT HOCKIN.

Witnesses:
CHAS. E. TANNER,
D. SUTHERLAND.